United States Patent
Klaussner et al.

(10) Patent No.: US 10,673,294 B2
(45) Date of Patent: Jun. 2, 2020

(54) CORONA SHIELDING SYSTEM FOR AN ELECTRICAL MACHINE

(71) Applicant: Siemens Aktiengesellschaft, Munich (DE)

(72) Inventors: Bernhard Klaussner, Nuremberg (DE); Jiri Lang, Nuremberg (DE); Steffen Lang, Hallerndorf (DE); Alexander Litinsky, Dusseldorf (DE); Guido Schmidt, Leichlingen (DE); Christian Schulz-Drost, Nuernberg-Neunhof (DE); Klaus Schaefer, Nuremberg (DE); Christian Staubach, Marl (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 324 days.

(21) Appl. No.: 15/511,344

(22) PCT Filed: Aug. 3, 2015

(86) PCT No.: PCT/EP2015/067788
§ 371 (c)(1),
(2) Date: Mar. 15, 2017

(87) PCT Pub. No.: WO2016/045845
PCT Pub. Date: Mar. 31, 2016

(65) Prior Publication Data
US 2017/0288488 A1    Oct. 5, 2017

(30) Foreign Application Priority Data
Sep. 25, 2014  (DE) .................. 10 2014 219 440

(51) Int. Cl.
*H02K 3/40* (2006.01)
*H01B 3/04* (2006.01)
(Continued)

(52) U.S. Cl.
CPC ................. *H02K 3/40* (2013.01); *H01B 1/20* (2013.01); *H01B 3/04* (2013.01); *H02K 3/30* (2013.01)

(58) Field of Classification Search
CPC ... H02K 3/40; H02K 3/42; H01B 3/04; H01B 3/10; H01B 3/12
(Continued)

(56) References Cited

U.S. PATENT DOCUMENTS 5,300,844 A    4/1994  Schuler .................... 310/215
5,319,276 A    6/1994  Schuler .................... 310/196
(Continued)

FOREIGN PATENT DOCUMENTS

CA   2360321 A    7/2000  ............. H02K 15/10
CN   1080096 A    12/1993  ............. H01K 15/12
(Continued)

OTHER PUBLICATIONS

Machine Translation, Groeppel, EP-2362399-A1, Aug. 2011. (Year: 2011).*
(Continued)

*Primary Examiner* — Thomas Truong
(74) *Attorney, Agent, or Firm* — Slayden Grubert Beard PLLC

(57) ABSTRACT

The present disclosure relates to electrical machines. The teachings thereof may be embodied in a corona shielding system, especially an outer corona shielding system, for an electrical machine. For example, a corona shielding system may include: a polymeric matrix; particles disposed in the matrix, including a mica-coated core and a layer of metal oxide disposed on the core; and a surface functionalization material disposed on a surface of the particles for binding to the matrix.

7 Claims, 1 Drawing Sheet

(51) Int. Cl.
*H02K 3/30* (2006.01)
*H01B 1/20* (2006.01)

(58) Field of Classification Search
USPC .................................. 310/43, 196, 214, 215
See application file for complete search history.

(56) References Cited

U.S. PATENT DOCUMENTS

| | | | | |
|---|---|---|---|---|
| 5,468,916 | A | 11/1995 | Litenas et al. | 174/127 |
| 6,017,627 | A | 1/2000 | Iwata et al. | 428/375 |
| 6,075,303 | A | 6/2000 | Schuler | 310/201 |
| 6,242,825 | B1 | 6/2001 | Mori et al. | 310/45 |
| 9,396,837 | B2 | 7/2016 | Kempen et al. | |
| 9,589,699 | B2 | 3/2017 | Gröppel et al. | |
| 2002/0029897 | A1 | 3/2002 | Younsi et al. | 174/120 R |
| 2003/0160676 | A1 | 8/2003 | Valdemarsson | |
| 2007/0114704 | A1* | 5/2007 | Stevens | D21H 13/44 264/643 |
| 2008/0066942 | A1 | 3/2008 | Miller | 174/36 |
| 2008/0143010 | A1* | 6/2008 | Kashikar | C03C 25/26 264/112 |
| 2012/0068560 | A1 | 3/2012 | Anderton et al. | 310/52 |
| 2013/0244022 | A1 | 9/2013 | Rueger et al. | 428/324 |
| 2014/0345907 | A1* | 11/2014 | Kempen | H01B 3/02 174/127 |

FOREIGN PATENT DOCUMENTS

| | | | | |
|---|---|---|---|---|
| CN | 1338141 | A | 2/2002 | ............. H02K 15/10 |
| CN | 102020850 | A | 4/2011 | ............. C08G 73/10 |
| CN | 103580338 | A | 2/2014 | ............. H02K 3/04 |
| DE | 102010009462 | A1 | 9/2011 | ............. H02K 3/40 |
| DE | 102010052889 | A1 | 6/2012 | ............. C09C 1/28 |
| DE | 102011083214 | A1 | 3/2013 | ............. H01B 13/16 |
| DE | 102011083228 | A1 | 3/2013 | ............. H01B 13/08 |
| DE | 102012208226 | A1 | 11/2013 | ............. H01B 13/22 |
| EP | 0049128 | A1 | 4/1982 | ............. H01B 3/04 |
| EP | 0049128 | A1 * | 4/1982 | ............. H01B 3/04 |
| EP | 0573796 | A1 | 12/1993 | ............. H02K 3/40 |
| EP | 2362399 | A1 | 8/2011 | ............. H01B 3/02 |
| EP | 2362399 | A1 * | 8/2011 | ............. H02K 3/40 |
| EP | 2582018 | A1 | 4/2013 | ............. H02K 3/40 |
| JP | 6122733 | A | 1/1986 | ............. H02K 3/40 |
| JP | 06217484 | A | 8/1994 | ............. H02K 3/34 |
| JP | 10116720 | A | 5/1998 | ............. H01B 17/56 |
| JP | 2005083760 | A | 3/2005 | ............. G04B 19/06 |
| JP | 2014112985 | A | 6/2014 | ............. H02K 3/34 |
| RU | 2088024 | C1 | 8/1997 | ............. H02K 3/40 |
| RU | 2100890 | C1 | 12/1997 | ............. H02K 3/30 |
| RU | 2291542 | C2 | 1/2007 | ............. H02K 15/10 |
| WO | WO-2013041359 | A2 * | 3/2013 | ............. H01B 3/02 |

OTHER PUBLICATIONS

Russian Office Action, Application No. 2017113770/07, 7 pages, dated Dec. 14, 2017.
Japanese Office Action, Application No. 2017516479, 4 pages, dated May 21, 2018.
International Search Report and Written Opinion, Application No. PCT/EP2015/067788, 11 pages, dated Nov. 10, 2015.
International Search Report and Written Opinion, Application No. PCT/EP2015/067791, 12 pages, dated Nov. 11, 2015.
International Search Report and Written Opinion, Application No. PCT/EP2015/067785, 12 pages, dated Nov. 25, 2015.
Chinese Office Action, Application No. 201580051404.6, 6 pages, dated Sep. 18, 2017.
Japanese Office Action, Application No. 2017516479, 4 pages, dated Feb. 25, 2019.
Chinese Office Action, Application No. 201580051374.9, 8 pages, dated Mar. 13, 2019.
Indian Office Action, Application No. 201717007794, 5 pages, dated Mar. 29, 2019.
U.S. Non-Final Office Action, U.S. Appl. No. 15/511,326, 33 pages, dated May 1, 2019.
U.S. Non-Final Office Action, U.S. Appl. No. 15/511,306, 29 pages, dated May 1, 2019.
U.S. Final Office Action, U.S. Appl. No. 15/511,306, 14 pages, dated Aug. 15, 2019.
U.S. Non-Final Office Action, U.S. Appl. No. 15/511,326, 19 pages dated Mar. 5, 2020.

* cited by examiner

CORONA SHIELDING SYSTEM FOR AN ELECTRICAL MACHINE

CROSS-REFERENCE TO RELATED APPLICATIONS

This application is a U.S. National Stage Application of International Application No. PCT/EP2015/067788 filed Aug. 3, 2015, which designates the United States of America, and claims priority to DE Application No. 10 2014 219 440.7 filed Sep. 25, 2014, the contents of which are hereby incorporated by reference in their entirety.

TECHNICAL FIELD

The present disclosure relates to electrical machines. The teachings thereof may be embodied in a corona shielding system, especially an outer corona shielding system, for an electrical machine.

BACKGROUND

Various high-voltage machines may include a generator for generation of electrical energy, an electric motor, or another piece of electrical equipment having a relatively high rated voltage, more particularly a transformer, a bushing, or a cable. Machines of ever higher power are being developed, for example generators, as advancing technology requires ever higher power density. A high-performance generator, for example a turbo generator, may include a stator with a (stator) lamination stack and a multitude of generator grooves with the generator winding therein.

The main insulation of the generator winding against the lamination stack is under high electrical stress. High voltages arise in operation, and must be dissipated in the insulation volume between the conductor bar under high voltage and the lamination stack at ground potential. This increases the field at the edges of the laminations in the lamination stack and the increase, in turn, causes partial discharges. These partial discharges, when they meet the insulation system, lead to significant local heating. This may gradually break down the organic materials of the insulation system to volatile products of low molecular weight, for example to carbon dioxide.

Many insulation systems include an outer corona shield. In larger generators and electric motors, an outer corona shield is applied directly to the surface of the generator winding insulation. Typically, the outer corona shield comprises carbon black- and graphite-containing tapes or coating materials. For system-related reasons, in such an insulation system, the interface between the outer corona shield and main insulation cannot be produced in completely pore-free form. Therefore, with sufficiently high electrical field strengths in the insulation system, there is correspondingly high electrical partial discharge activity, which completely burns out the outer corona shield over time. This leads to premature aging of the insulation and in the worst case to a ground fault of the electrical machine. Such a fault regularly means irreparable complete failure of the machine.

The outer corona shield must have a certain square resistance within a particular range. If it is too low, the lamination stacks can be electrically short-circuited, leading to high induced circulating currents occurring across the ends of the lamination stacks and lead to high-current arcs. In the case of excessive resistance, by contrast, there can be high-voltage spark erosion. Ideally, the resistance in the outer corona shield would be adjustable, such that it would be possible to establish anisotropy, showing elevated conductivity in the radial direction, i.e., from the current conductor toward the lamination stack, and elevated resistance, i.e., low conductivity, in bar direction.

SUMMARY

The teachings of the present disclosure may overcome the disadvantages of conventional corona shielding systems and provide a more stable corona shielding system. For example, a corona shielding system for an electrical machine may comprise a polymeric matrix and particles disposed therein having a mica-coated core and a layer formed by metal oxide disposed on the core, wherein the particles have surface functionalization, especially for binding to the matrix.

In some embodiments, the metal oxide is tin oxide.

In some embodiments, the matrix has been formed with plastic and/or with resin, especially a reactive resin.

In some embodiments, the functionalization comprises a molecule covalently bonded to tin oxide and/or the matrix.

In some embodiments, the functionalization comprises an oligomeric structure.

In some embodiments, the functionalization comprises a polymeric structure.

In some embodiments, the functionalization far from the core is formed with lower electrical polarity than close to the core and/or the core itself.

Some embodiments may include an electrical machine, especially high-voltage machine, having a corona shielding system as described above.

DETAILED DESCRIPTION

Figure 1:
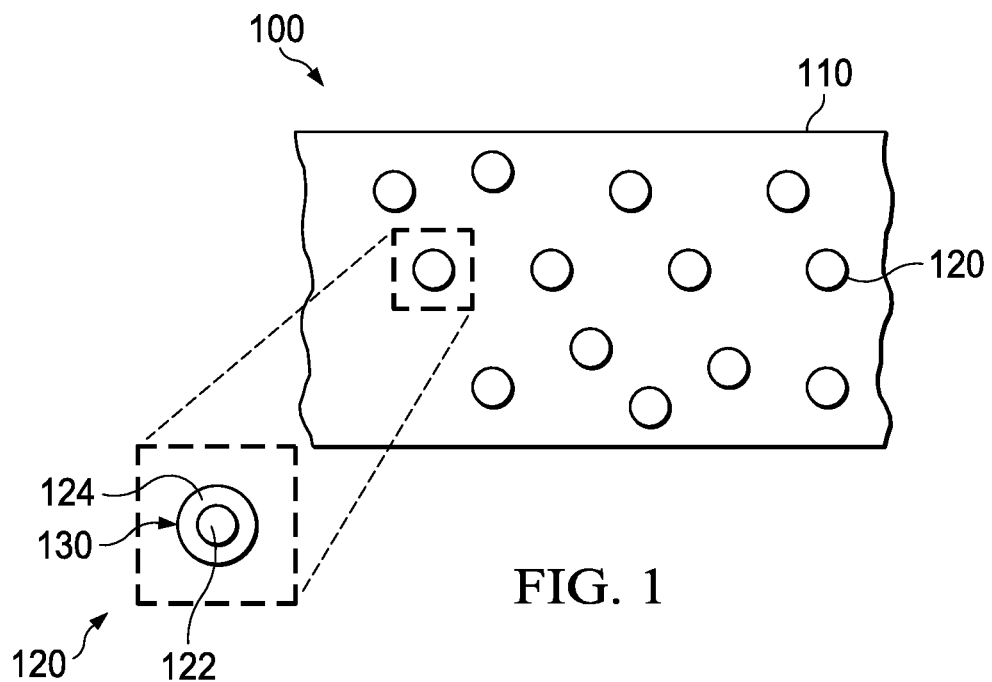
FIG. 1 shows an example corona shielding system.

The corona shielding systems described in the present disclosure may include corona shielding systems for an electrical machine, especially a high-voltage machine, appropriately a generator for generation of electrical energy, an electric motor, or another piece of electrical equipment having a relatively high rated voltage, e.g., a transformer, a bushing, or a cable. In some embodiments, the corona shielding system includes an outer corona shielding system. In some embodiments, the corona shielding system comprises a polymeric matrix and particles disposed therein having a mica-coated core and a layer formed by metal oxide disposed on the core, wherein the particles have surface functionalization, especially for binding to the matrix.

The metal oxide may include tin oxide, e.g., tin dioxide. The matrix may be formed with plastic and/or with resin, e.g., a reactive resin.

By means of the surface functionalization for binding to the matrix, it is possible to reduce or even entirely avoid defects at the interface between the particle surface and the matrix. More particularly, for avoidance of defects, not only adhesion forces between the surface of the particles and the matrix are available; instead, the binding is enhanced by the surface functionalization. Delamination of the corona shielding system at the interface between the particle surface and matrix is thus counteracted. However, such defects that are critical because of the field line profile resulting from different permittivities of the particles and the matrix, specifically with regard to the expected electrical lifetime of the corona shielding system and hence the electrical machine. In some embodiments, the otherwise prevailing adhesion forces between the particle surface and matrix are at least partly replaced by covalent chemical bonds between the particle surface and matrix.

In some embodiments, the particles have dimensions of, at least on average (arithmetic average), not more than one millimeter, e.g., at least on average (arithmetic average), not more than 100 micrometers.

In some embodiments, the surface functionalization comprises molecules which firstly bind readily to the tin oxide surface of the particle, but secondly bind readily to the matrix. For example, in some embodiments, the surface functionalization comprises an organosilane.

In some embodiments, the functionalization in the corona shielding system of the invention comprises a molecule covalently bonded to metal oxide and/or the matrix.

In some embodiments, in the corona shielding system, the functionalization comprises an oligomeric structure. In some embodiments, the functionalization comprises a polymeric structure.

In some embodiments, the functionalization far from the core is formed with lower electrical polarity than close to the core and/or the core itself. In some embodiments, the functionalization comprises mercapto-propyltrimethoxysilane.

The functionalization with matrix-optimized structures and/or molecules improves sedimentation characteristics, meaning that the density is reduced and the current resistance is increased. Thus, the particles may be homogeneously distributed in the matrix. In some embodiments, the functionalization homogenizes the transition between the permittivities of the particles and the matrix. Wetting of the particles with the liquid matrix is distinctly improved as a result of the matching of the surface energy of the particles to a fluid matrix.

FIG. 1 shows an example corona shielding system 100 for an electrical machine incorporating the teachings of the present disclosure. The corona shielding system 100 comprises a polymeric matrix 110, and particles 120 disposed in the polymeric matrix 110. The particles 120 comprise a mica-coated core 122 and a layer 124 formed by a metal oxide disposed on the core 122. The corona shielding system 100 also comprises a surface functionalization material 130 disposed on a surface of the particles 120 for binding to the matrix 110.

Figure 2:
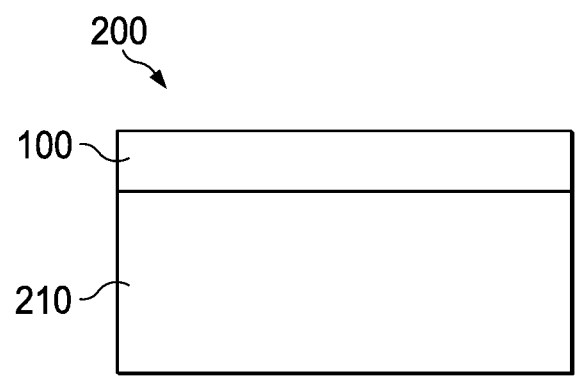
FIG. 2 shows an example electrical machine.

FIG. 2 shows an example electrical machine 200 incorporating the teachings of the present disclosure. The electrical machine 200 comprises a high-voltage machine 210 and a corona shielding system 100. The corona shielding system 100 comprises a polymeric matrix 110, and particles 120 disposed in the polymeric matrix 110. The particles 120 comprise a mica-coated core 122 and a layer 124 formed by a metal oxide disposed on the core 122. The corona shielding system 100 also comprises a surface functionalization material 130 disposed on a surface of the particles 120 for binding to the matrix 110.

In some embodiments, the electrical machine comprises a high-voltage machine, e.g., a generator for generation of electrical energy, or an electric motor, or another piece of electrical equipment having a relatively high rated voltage, e.g., a transformer, a bushing, or a cable.

What is claimed is:

1. A corona shielding system for an electrical machine, the system comprising:
    a polymeric matrix;
    particles disposed in the polymeric matrix, the particles comprising a mica-coated core and a layer formed by a metal oxide disposed on the mica-coated core; and
    a surface functionalization material disposed on the metal oxide for forming covalent chemical bonds between the metal oxide and the matrix.

2. The corona shielding system as claimed in claim 1, wherein the metal oxide comprises tin oxide.

3. The corona shielding system as claimed in claim 1, wherein the polymeric matrix comprise plastic or resin.

4. The corona shielding system as claimed in claim 1, wherein the surface functionalization material comprises an oligomeric structure.

5. The corona shielding system as claimed in claim 1, wherein the surface functionalization material comprises a polymeric structure.

6. The corona shielding system as claimed in claim 1, wherein the surface functionalization material has a lower electrical polarity than an electrical polarity of the mica-coated core.

7. An electrical machine comprising:
    a high-voltage machine;
    and corona shielding system comprising:
    a polymeric matrix;
    particles disposed in the polymeric matrix, the particles comprising a mica-coated core and a layer formed by a metal oxide disposed on the mica-coated core; and
    a surface functionalization material disposed on the metal oxide for forming covalent chemical bonds between the metal oxide and the matrix.

* * * * *